United States Patent [19]

Kawata et al.

[11] Patent Number: 4,744,040

[45] Date of Patent: May 10, 1988

[54] DISTANCE MEASUREMENT METHOD MAKING USE OF ELECTROMAGNETIC WAVE AND SYSTEM THEREFOR

[75] Inventors: Yutaka Kawata; Takuya Kusaka; Hiroshi Imada, all of Kobe,, Japan

[73] Assignee: Kabushiki Kaisha Kobe Seiko Sho, Kobe, Japan

[21] Appl. No.: 943,874

[22] Filed: Dec. 19, 1986

Related U.S. Application Data

[63] Continuation of Ser. No. 601,584, Apr. 18, 1984, abandoned.

[30] Foreign Application Priority Data

Apr. 21, 1983 [JP] Japan .................. 58-70808

[51] Int. Cl.[4] .................. G01S 13/00; G01S 7/04; G08B 21/00
[52] U.S. Cl. .................. 364/561; 342/124; 342/130; 342/174; 340/612
[58] Field of Search ............. 364/561; 340/612, 617; 73/290 R, 290 B, 290 V; 342/118, 120, 124, 128, 130, 173, 174

[56] References Cited

U.S. PATENT DOCUMENTS

| | | | |
|---|---|---|---|
| 3,727,897 | 4/1973 | Bennett | 342/124 X |
| 4,014,021 | 3/1977 | Fournier et al. | 364/561 X |
| 4,044,354 | 8/1977 | Bosher et al. | 343/14 |
| 4,133,036 | 1/1979 | Watson | 364/477 |
| 4,210,023 | 7/1980 | Sakamoto et al. | 343/12 R X |
| 4,234,882 | 11/1980 | Thompson | 343/14 |
| 4,236,465 | 12/1980 | Matteini | 340/617 X |
| 4,245,221 | 1/1981 | Kipp et al. | 343/14 X |
| 4,321,602 | 3/1982 | Kipp | 343/14 |
| 4,354,382 | 10/1982 | Hägglund | 73/290 R |
| 4,367,473 | 1/1983 | Marin et al. | 364/561 X |
| 4,388,622 | 6/1983 | Fletcher, Jr. | 343/14 |
| 4,503,433 | 3/1985 | Tomasi | 342/124 X |
| 4,507,658 | 3/1985 | Keating | 342/118 |
| 4,539,588 | 9/1985 | Ariessohm et al. | 358/101 X |
| 4,621,264 | 11/1986 | Yashiro et al. | 342/124 |

OTHER PUBLICATIONS

Ismail, M. A. W., "A Precise New System of FM Radar", *Proceedings of the IRE*, Sep. 1956, pp. 1140–1145.
Skolnik, *Introduction to Radar Systems*, pp. 96–101, 1962.
Belsterling, C. A., "A Look at Level Measurement Methods", *Instruments and Control Systems*, Apr. 1981, pp. 37–45.

*Primary Examiner*—Parshotam S. Lall
*Assistant Examiner*—Joseph L. Dixon
*Attorney, Agent, or Firm*—Oblon, Fisher, Spivak, McClelland & Maier

[57] ABSTRACT

A method an apparatus for measuring the distance to a target wherein FM wave is transmitted to the target and its reflected wave is received. A beat wave is then obtained using the thus-received wave and the FM wave. A sine wave is mixed with the beat wave and a first sideband wave of a plurality of sideband waves of the resultant mixed wave is obtained. Another sine wave is mixed with the sideband wave. Then, a second sideband wave of the thus-obtained mixed wave is separated and detected. In the above manner, phase modulation is applied directly to the above-described beat wave. Information pertaining to distance can then be obtained from the number of peaks of the thus-modulated beat wave. A microwave profile meter suitable for use in the determination of the surface profile of a burden in a blast furnace is also disclosed.

4 Claims, 6 Drawing Sheets

DISTANCE MEASUREMENT METHOD MAKING USE OF ELECTROMAGNETIC WAVE AND SYSTEM THEREFOR

This application is a continuation of application Ser. No. 601,584, filed Apr. 18, 1984, now abandoned.

BACKGROUND OF THE INVENTION

1. Field of the Invention

This invention relates to a method for measuring the distance to a target by transmitting a frequency-modulated wave to the target and obtaining distance-pertaining information from a beat wave of a wave reflected from the target and the transmitted wave, and to a system suitable for use in the practice of the method.

2. Description of the Prior Art

Distance measurement methods or systems of the above-described sort, which are known generally as FM-CW radars, are employed to transmit FM-modulated microwaves to targets and to obtain distance-pertaining information contained in the phase fractions of waves received from the targets. To take out the distance-pertaining information from the phase fraction of each of such received waves, it is generally known to obtain a beat wave of the transmitted wave and received wave and then count the peaks of the beat wave. In this case, a count of n or n+1 is obtained over a single period of the FM modulation, depending on the state of the initial phase which is dependent on the distance to be measured. Thus, the above count is accompanied by a so-called intrinsic error $d_c$. This intrinsic error is intolerably large when measuring short distances, because it reaches for example 3.75 m where a microwave of 10 GHz is employed and the maximum frequency shift of the FM modulation is set at 10 MHz. Since this intrinsic error is in inverse proportion to the maximum frequency shift, the intrinsic error may be reduced to a tolerable level provided that the maximum frequency shift is set at 1 GHz or greater. However, an apparatus or system capable of yielding such a high maximum frequency shift is extremely costly.

In order to reduce the above-mentioned intrinsic error, modulation is applied to the phase fraction of each beat wave and the number of peaks is counted over the period $T_1$ of modulation. The period $T_1$ of modulation for the phase faction is usually set at a level significantly longer than the period $T_2$ of FM modulation, and moreover at a level an integer times the period $T_2$ of FM modulation (namely, $T_1/T_2 = m$). Accordingly, the following equation can be established by converting a count $\Sigma N$ obtained over the period $T_1$ of modulation into the number of peaks of a wave for the period $T_2$ of FM-modulation:

$$n = \frac{\Sigma N}{m} = n_0 + \delta$$

where $n_0$ is an integer, and $0 \leq \delta < 1$. Therefore, it is feasible to count fractions of the number of peaks.

The fractions may be correctly counted when, upon conducting the above-mentioned phase modulation, the phase is swept from $\phi$ to $\phi + k\pi$ (k—being an integer) so as to render the resulting count irrelevant to the initial phase $\phi$ of each beat wave. If the modulation band of the phase reaches $k'\pi + \Delta$ ($k'$: integer, $0 \leq \Delta < \pi$), an error, however, develops in the counting of the fractions, leading to a so-called folded error.

To perform the above-mentioned phase modulation, it has heretofore been known to adopt the so-called double FM method or to provide a phase shifter with a high-frequency circuit unit.

In the case of the former method, a beat wave is represented by the following equation where the second FM-modulated wave is a triangular wave:

$$E'c = KA \cos[\omega_c \tau + \gamma \cos \omega_\mu t + 8\pi \Delta F_2 \tau \mu_2 t]$$

where $F_2$: frequency of the second FM modulation, and $$\tau : \frac{2d}{c} = \frac{2 \times \text{(distance measured)}}{\text{speed of light}}$$

Thus, the distance-pertaining information is contained in the second member of the above equation, i.e., $(8\pi \Delta F_2 \cdot \tau \cdot \mu_2 \cdot t)$. The modulation band of a phase changes whenever the distance to a target varies. Hence, $\Delta = 0$ is generally not satisfied except for the specific distance ndc. Here again, the above-mentioned folded error is developed.

This folded error reaches 70 cm or so where the frequency shift is set at 10 MHz and the prescribed distance is set at 5 m.

Incidentally, the double modulation method permits a reduction in the return error if the maximum frequency shift of the first FM modulation is set at a higher level. However, an apparatus or system relying upon frequency modulation of such a wide band lacks wide applicability and as mentioned above, is more costly.

In the case of the latter method, a modulator making use of a ferrite or PIN diode or a similar device is used as a phase shifter for electromagnetic waves. Such modulators are, however, accompanied by such shortcomings or poor linearity and thus cannot set modulation bands with acceptable accuracy. Therefore, use of the latter method results in difficulty in reducing measurement errors to desired levels.

As an alternative method, it has also been proposed to transmit a frequency-modulated electromagnetic wave of a wavelength $\lambda$ to a target and to receive a wave reflected from the target while moving a receiving antenna over a distance $\frac{1}{4}\lambda$ or another distance which is an integer times the former distance. The received wave is mixed and detected together with the transmitted wave, thereby obtaining a beat wave of both waves. The thus-obtained beat wave contains distance-pertaining information and has been subjected to phase modulation owing to the above-mentioned movement of the antenna. The number of peaks of the beat wave is counted and averaged in accordance with the detection method of zero-cross points or the like, thereby obtaining information which represents the desired distance.

Furthermore, it has also been proposed to employ a mechanical phase modulation which makes use of a slide short method. The above-described antenna moving method and the slide short method are both mechanical modulation methods and thus require drive mechanisms to perform phase modulation. They are therefore accompanied by such drawbacks that systems or apparatus relying upon such methods are unavoidably high in price and large in size.

It has also been proposed to apply phase modulation indirectly to a beat wave by subjecting the carrier wave to phase modulation in each of the above-referred to methods. However, it has been proposed that a direct application of phase modulation to a beat wave having a low frequency is more advantageous. However, a beat wave is not a sine wave and its frequency varies in accordance with the distance to be measured. Therefore, it has been difficult to apply phase modulation directly to beat waves.

A variety of distance measurement apparatus or systems has heretofore been employed to carry out the above-described distance measurement methods. They may be used in various fields without physically contacting with targets. An example of such application is the non-contact measurement of the height or distribution pattern of a burden in a blast furnace.

With a view toward achieving stabilized operation of a blast furnace and an improvement in its fuel efficiency, it is generally practiced to control the distribution pattern of charged raw materials to a desired pattern in a blast furnace. For this purpose, it is required to measure the distribution pattern of each burden at a top portion of a blast furnace.

Many patent and utility model applications have been obtained on apparatuses or systems suitable for fulfilling the above purpose, namely, for measuring the distribution patterns of burdens charged in blast furnaces by means of electromagnetic waves such as microwaves.

The followings are examples of such patent and utility model applications:

Japanese Patent Laid-open No. 58560/1977:

A burden is scanned diametrically while rotating an antenna, so that the distribution pattern of the burden in a furnace can be measured.

Japanese Patent Laid-open No. 6669/1978:

A microwave distance-measuring apparatus is equipped with a measurement circuit and calibration circuit. The circuits are switched over so as to calibrate the apparatus.

Japanese Patent Laid-open No. 102073/1978:

A profile-measuring system is employed to determine the surface profile of a burden in a blast furnace. A microwave distance-measuring unit is arranged in a tip portion of a lance. The purging and cooling method for the distance-measuring unit is disclosed.

Japanese Utility Model Laid-open No. 151907/1981:

The angle of a reflect antenna is adjusted to cause a microwave to impinge upon the surface of a burden at a right angle.

Japanese Utility Model Laid-open No. 151958/1981:

A microwave transmission circuit unit is mounted in a tip portion of a lance, which unit is integrally constructed with antennas. Compensating waveguides are provided in the circuit unit so that loss of each microwave is cancelled within the circuit unit.

Japanese Patent Laid-open No. 59181/1982:

A calibrating transmission line is provided to calibrate each distance. The measurement mode and calibration mode are alternately and succesively switched over.

Japanese Patent Laid-open No. 166573/1982:

A microwave distance-measuring system making use of the AM modulation method is disclosed.

Conventional electromagnetic wave (hereinafter referred to as "microwave") profile meters or sounding meters are each constructed of an FM-CW radar which makes use of a microwave of either an X-band (10 GHz) or V-band (50 GHz) type. X-band microwaves are employed primarily for their possibility of manufacturing meters at lower overall costs. On the other hand, V-band microwaves are used principally for their capacity of achieving the focusing of beams by small antennas (spreading angle $a\lambda/D$, where D is an antenna aperture and $\lambda$ is the wavelength of a microwave).

It should also be noted that the accuracy of measurement by a microwave profile meter or sounding meter is dependent on the reciprocal of the modulation band in the case of an FM-CW radar. Accordingly, frequency modulation bands of several GHz have been chosen for commercial FM-CW radars. As a result, their oscillators are high in price and large in size. On the other hand, it is better to construct an antenna and oscillator into a unitary assembly in order to make the radar smaller and facilitate its maintenace. For this purpose, a narrow-band oscillator may be used as the oscillator. Since a narrow-band oscillator can be fabricated using a Gann diode (GaAs device) so long as its modulation band is up to 150 MHz, a microwave radar has very compact dimensions and may thus be housed within a lance.

It is necessary to perform special signal processing in order to improve the accuracy of a narrow-band FM-CW radar such as those mentioned above. The above-listed Japanese patent and utility model publications may be referred to in this concern.

SUMMARY OF THE INVENTION

With the foregoing in view, the present invention has as an object the provision for an electromagnetic wave distance-measuring method in which phase modulation is applied directly to each beat wave in accordance with processing of signals by an electronic circuit so that measurement results of high accuracy may be obtained with relatively low expenses.

Another object of this invention is to provide an electromagnetic wave distance-measuring system which is suitable for use in the practice of the above-mentioned method.

In order to achieve the above-described objects, an FM wave is transmitted to a target and its reflected wave is received. A beat wave is then obtained using the thus-received wave and the FM wave. Thereafter, a sine wave of a frequency $f_1$ is mixed with the beat wave and one of the sideband waves of the resultant mixed wave is obtained. Another sine wave of a frequency $f_2$ is mixed with the sideband wave. Then, one of sideband waves of the thus-obtained mixed wave is separated and detected. In the above manner, the present invention permits applying phase modulation to the above-described beat wave and then obtaining distance-pertaining information from the number of peaks of the thus-modulated beat wave.

In one aspect of this invention, there is thus provided a method for measuring the distance to a target by transmitting a frequency-modulated electromagnetic wave to the target, receiving a reflected wave from the target, mixing the thus-received wave and the thus-transmitted wave into a beat wave and then detecting the beat wave, which method comprises:

(i) mixing the beat wave with a sine wave having a frequency $f_1$ and extracting one of sideband waves of the resultant mixed wave, and then mixing the thus-extracted sideband wave with a sine wave having a frequency $f_2$ and extracting one of sideband waves of the resulting mixed wave, so that phase modulation is applied to the beat wave according to the relationship $1/(f_1-f_2)$;

(ii) counting the number of peaks of the thus-phase modulated beat wave for the period $1/(f_1-f_2)$ of the phase modulation; and thereafter, (iii) computing the distance to the target on the basis of the result of counting the number of peaks.

In another aspect of this invention, there is also provided a system for measuring the distance to a target in a dusty, high-temperature atmosphere by transmitting a frequency-modulated electromagnetic wave to the target and selectively obtaining distance information contained in a wave received from the target, which system comprises:

(i) a narrow-band FM-CW radar divided into a wave circuit unit and antenna circuit unit with a refractory, gas-impermeable, electromagnetic wave transmittable member hermetically interposed therebetween, to thereby avoid possible intrusion of the atmospheric gas into the wave circuit unit;

(ii) cooling means adapted to cool the wave transmission unit; and (iii) dust purge means adapted to feed an inert gas to the antenna circuit unit and electromagnetic wave transmittable member so as to avoid possible deposition of dust on the antenna circuit unit and electromagnetic wave transmittable member.

According to the method of this invention, phase modulation can be applied directly to a beat wave obtained from a transmitted wave and a received wave which has been reflected by a target and has then been received. This phase modulation is governed by a difference between the frequency $f_1$ and the frequency $f_2$. Therefore, the linearity of the phase modulation can be improved and at the same time, the width of the phase modulation can be correctly controlled, thereby making it possible to reduce the intrinsic error.

In addition, the high frequency circuit unit can be reduced both in size and weight because the frequency band of the FM modulation can be narrowed to about 100 MHz or so.

The phase modulation to each beat wave can be performed by means of an electronic circuit. Therefore, the above method has obviated any mechanical drive unit, different from the mechanical phase modulation method. This feature has made it possible to reduce the overall size of an electromagnetic wave distance-measuring apparatus or system smaller and to manufacture such an apparatus or system at a lower cost.

Furthermore, the phase modulation is applied directly to each beat wave, thereby allowing the use of a simpler high frequency circuit as compared with the conventional PIN diode or ferrite method.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
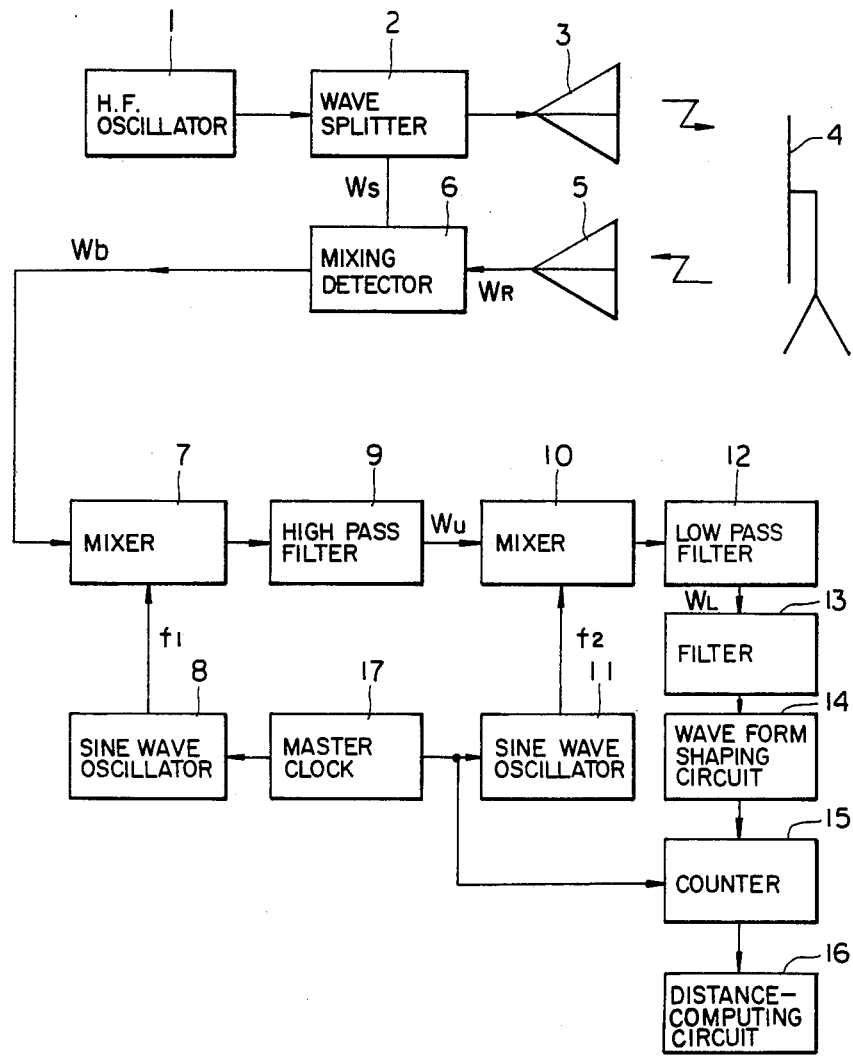
FIG. 1 is a block diagram of a system suitable for use in the practice of a distance-measuring method according to one embodiment of this invention.

In FIG. 1, a frequency-modulated electromagnetic wave (hereinafter called a "transmission wave") is generated from a high-frequency oscillator 1. The transmission wave $W_S$ is divided into two transmission waves by a wave splitter 2. One of the transmission waves is given off as an FM-modulated electromagnetic wave from a transmitting antenna 3 to a target 4. A reflected wave which has been reflected from the target 4 is received by a receiving antenna 5.

This received wave $W_R$ is impressed to a mixing detector 6. The aforementioned transmission wave $W_S$ has already been impressed directly from the wave splitter 2 to the mixing detector 6. Accordingly, the mixing detector 6 mixes and detects the received wave $W_R$ and transmission wave $W_S$, thereby outputting a beat wave $W_b$.

The thus-obtained beat wave $W_b$ is then applied to a mixer 7, where it is mixed with a sine wave of a frequency $f_1$ fed from a sine wave oscillator 8. The resulting mixed wave is then caused to pass through a high pass filter 9. Thus, an upper sideband wave $W_u$ of the resulting mixed wave is separated and is then output.

Now presuming that the voltage waveform of the beat wave $W_b$ is $E_b$ and the output voltage waveform of the sine wave oscillator 8 is $E_{r1}$. Then, $E_b$ and $E_{r1}$ are represented respectively by the following equations:

$$E_b = A_b \sin(2\pi f_b t + \phi_b) \qquad (1)$$

where $A_b$ denotes the amplitude of voltage of beat signal;
$f_b$ in the center frequency of beat signal; and
$\phi_b$ represents the initial phase of beat signal.

$$E_{r1} = A_1 \sin(2\pi f_1 t + \phi_1) \qquad (2)$$

On the other hand, the voltage waveform of the above-described upper sideband wave $W_u$ can be expressed by the following equation (3):

$$E_u = A_u \sin\{2\pi(f_b + f_1)t + \phi_1 + \phi_b\} \qquad (3)$$

The upper sideband wave $W_u$ which has been obtained in the manner described above is thereafter impressed to a mixer 10, where it is mixed with a sine wave of a frequency $f_2$ delivered from a sine wave oscillator 11. The resultant mixed wave is caused to pass through a low pass filter 12, thereby separating and outputting a lower sideband wave $W_L$ of the mixed wave.

The output voltage waveform $E_{r2}$ of the sine wave oscillator 11 is represented by the following equation (4):

$$E_{r2} = A_2 \sin(2\pi f_2 t + \phi_2) \qquad (4)$$

Therefore, the voltage waveform of the lower sideband wave $W_L$ of the above mixed wave can be defined by the following equation (5):

$$E_L = A_L \sin\{2\pi(f_b + f_1 - f_2)t + \phi_b + \phi_1 - \phi_2\} \quad (5)$$

where $A_L = k A_b A_1 A_u$ and k denotes the conversion coefficient of mixer

Here, defining $T_1 = 1/(f_1 - f_2)$ and replacing $(\phi_b + \phi_1 - \phi_2)$ by $\phi'$ {i.e., $\phi' = \phi_b + \phi_1 - \phi_2$}, Equation (5) may be modified to the following equation (6):

$$E_L = A_L \sin\left(2\pi f_b t + \frac{2\pi t}{T_1} + \phi'\right) \quad (6)$$

Comparing Equation (6) with Equation (1), it is understood that the lower sideband wave $W_L$ is a wave obtained by linearly modulating the initial phase member of the original beat wave $W_b$ in accordance with the period $T_1$.

The lower sideband wave $W_L$, which has been obtained from the low pass filter 12 and is represented by Equation (6), is delivered to a filter 13 so that higher harmonics are removed there. The resultant signal is then fed to a waveform shaping circuit 14, thereby generating pulses which correspond to the zero-cross points of the lower sideband wave $W_L$ expressed by Equation (6). Here, the zero-cross points through which the above sideband wave rises from negative (−) to positive (+) are relied upon by way of example.

These pulses are then fed to a counter 15 and are counted over the period $T_1$ of the phase modulation. Thus, the number of peaks of the lower sideband wave is counted.

The result $\Sigma N$ of counting by the counter 15 is fed to a distance-computing circuit 16, where the number n of peaks of the lower sideband wave $W_L$ per period of the frequency modulation period $T_2$ for the transmission wave $W_S$ is computed in accordance with Equation (7) and the distance d to the target is thereafter calculated in accordance with Equation (8).

$$n = \Sigma N/m \quad (7)$$

where m: $T_1/T_2$ $T_1$ in the phase modulation period $T_2$ represents the frequency modulation period $$d = nxc/4\Delta F \quad (8)$$

where $\Delta F$ is the maximum FM frequency shift of the transmission wave $W_S$, and c denotes speed of light In order to make the phase modulation period $T_1$ more correct, the oscillation frequency of each of the sine wave oscillators 8,11 may desirously be determined on the basis of the oscillation frequency of a master clock 17.

Figure 2:
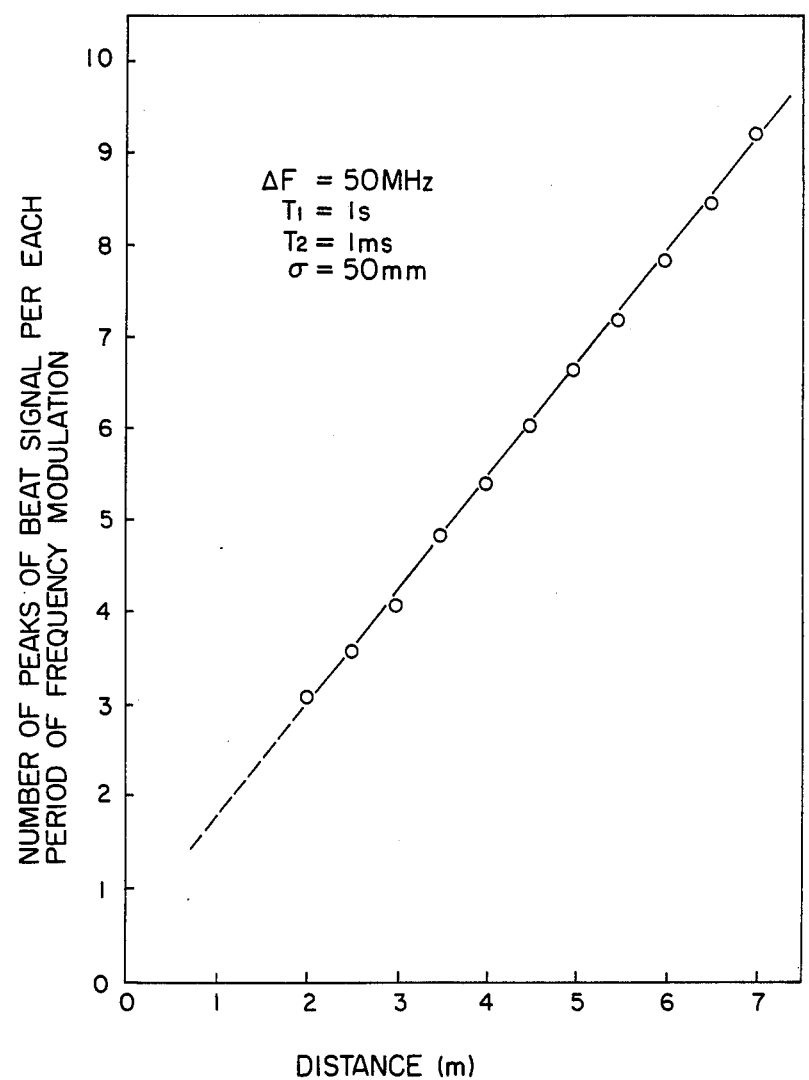
FIG. 2 is a graphic representation which the results of distance measurement performed in accordance with the distance-measuring method.

FIG. 2 illustrates diagrammatically one example of results of a distance-measuring experiment, wherein results were obtained in accordance with the method of this invention.

In the example shown in FIG. 2, the following conditions were followed:

Frequency of transmission wave: 24 GHz $T_1$: 1 second $T_2$: 1 millisecond $\Delta F$: 50 MHz In this example, the residual error was 5 cm. Compared with an intrinsic error of 75 cm in the conventional FM radar method, the method of this invention has reduced the error to 1/10 or less.

Reference is next made to FIGS. 3 through 6 of the accompanying drawings to describe the microwave profile meter of this invention.

Figure 3:
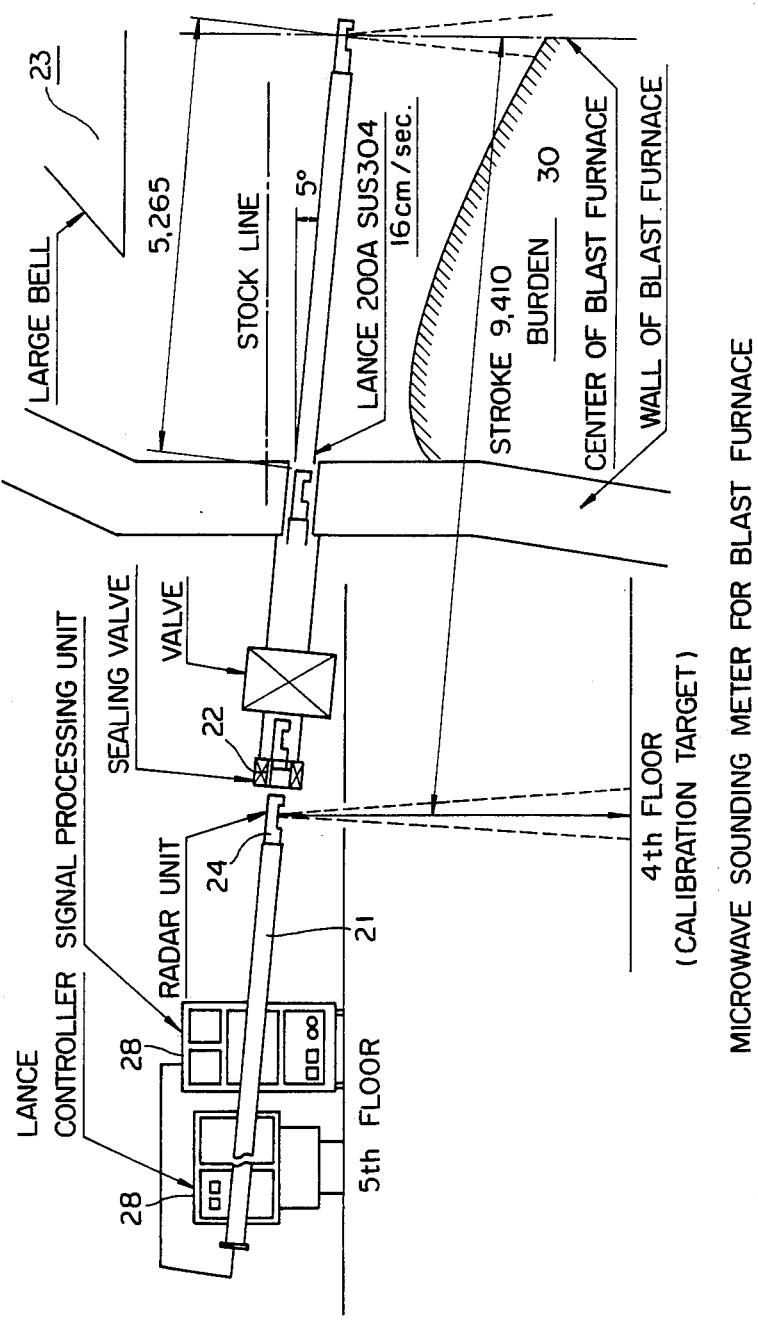
FIG. 3 is a schematic front elevational view of a microwave profile meter according to another embodiment of this invention, in which the microwave profile meter is applied to a blast furnace.

The overall structure of the microwave profile meter is shown in FIG. 3. A lance 21 is inserted through a sealing valve 22 into a blast furnace 23 by means of a drive unit (not shown). The drive unit can move the lance 21 across the blast furnace 23. The lance 21 is generally held at a waiting position. Upon measurement, the lance 21 is caused to advance to a measurement-preparing station and is then inserted into the furnace 23 at a constant speed. When calibrating a microwave radar 24 attached to a tip portion of the lance 21, the tip portion is pulled out of the furnace 23 and is stopped at an inspection station. The underlying floor is used as a target for calibration.

Figure 4:
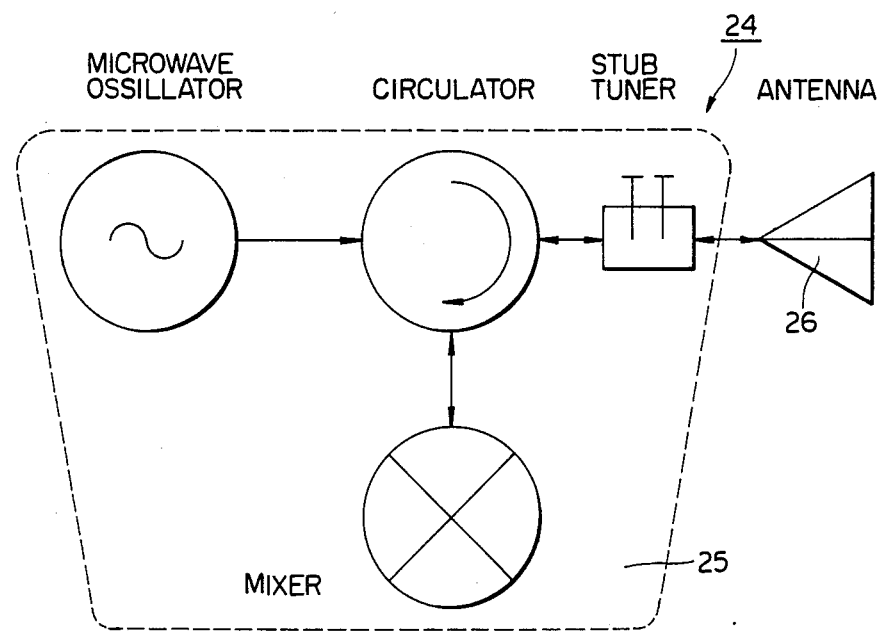
FIG. 4 is a block diagram of a microwave circuit unit arranged in the microwave profile meter.

The structure of the microwave radar 24 will next be described with reference to FIG. 4. The radar 24 is constructed of a wave circuit unit 25 and an antenna 26. The wave circuit unit 25 includes an oscillator, circulator, stub tunner and waveguides connecting the devices together.

Figure 5:
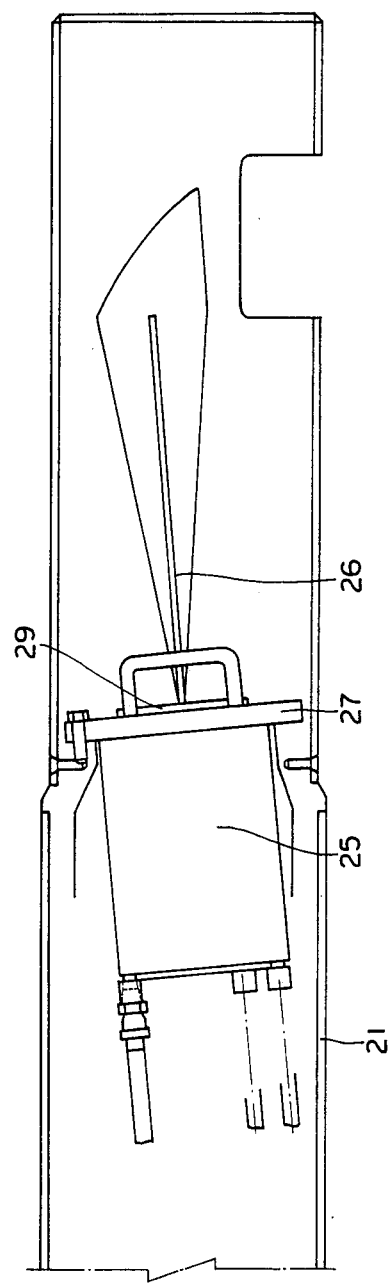
FIG. 5 is a partly cross-sectional view of a microwave radar arranged in the microwave profile meter.
Figure 6:
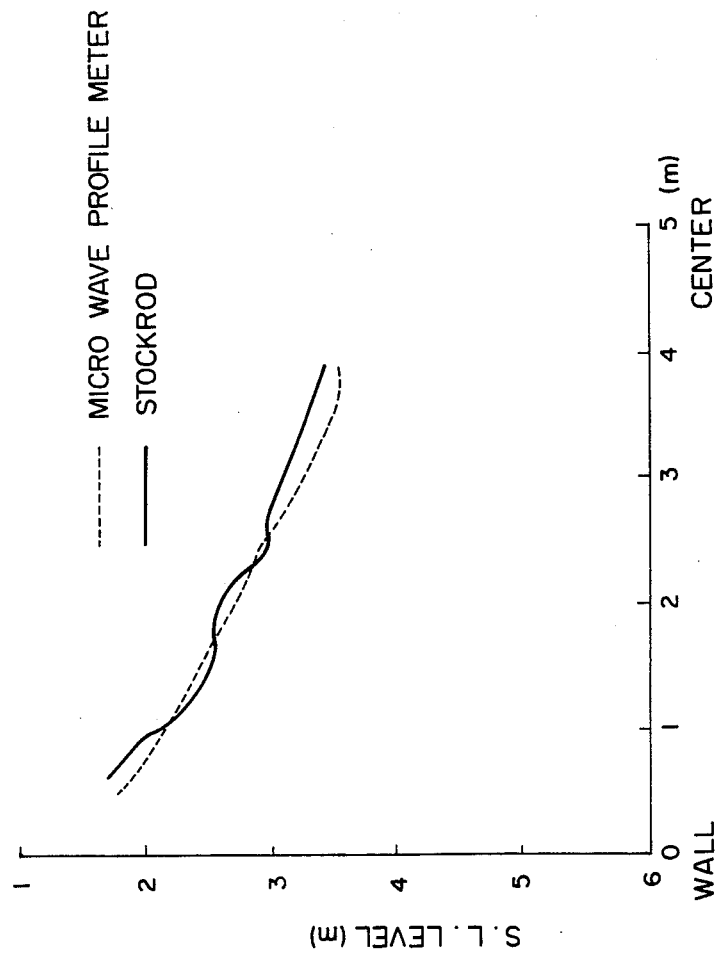
FIG. 6 is a graph showing the surface profile of a burden in a blast furnace, determined by the profile meter.

Referring next to FIG. 5, the wave circuit unit 25 is arranged in a water-cooled housing 27 so as to prevent each device from being heated beyond its withstandable upper temperature limit. By the wave circuit unit 25, the oscillation of a transmitting wave, its frequency modulation and production of a beat signal from the tranmitting wave and a received wave are all performed. Only beat signals of the intermediate frequency band are sent, after their amplification, to a signal processing unit 28 (see, FIG. 3) arranged in a rear end portion of the lance 21. It is unnecessary to use waveguides for the connection between the signal processing unit 28 and radar 24. They are coupled together by usual transmission lines. In the illustrated embodiment, the wave circuit unit 25 and antenna 26 are assembled into a unitary body. They can thus be pulled out readily of the lance 21 through the front end of the lance 21, thereby facilitating their maintenance.

The wave circuit unit 25 and antenna 26 are connected together with a silica glass window 29 interposed therebetween. The silica glass window 29 has a size substantially equal to the cross-sectional area of the wave guide and permits the transmission of microwaves therethrough but shuts off the furnace gas. The radar 24 is constructed in such a way that the silica glass window 29 and antenna 26 may be purged with an inert gas, for example, nitrogen gas so as to avoid possible deposition of dust thereon.

The profile of the surface of a burden 30 in the blast furnace 23 was measured by the microwave profile meter of this invention. Measurement results are diagrammatically shown in FIG. 6. It will be readily understood that the surface of the burden was linearly sloped downwardly from the wall of the furnace toward its center. It will also be seen that very good agreement exists between the surface profile determined by the above microwave profile meter and that obtained by a conventional stockrod.

Having now fully described the invention, it will be apparent to one of ordinary skill in the art that many changes and modifications can be made thereto without departing from the spirit or scope of the invention as set forth herein.

What is claimed is:

1. A method for measuring a distance to a target by transmitting a frequency-modulated electromagnetic wave to the target, receiving a reflected wave from the target, mixing the thus-received wave and the thus-transmitted wave into a beat transmitted wave into a beat wave and then detecting the beat wave, which comprises:

mixing the beat wave with a sine wave having a frequency $f_1$ and extracting an upper sideband wave of a plurality of sideband waves of the resultant mixed wave, and then mixing the thus extracted upper sideband wave with a sine wave having a frequency $f_2$ and extracting a lower sideband wave of said plurality of sideband waves of said resulting mixed wave, so that phase modulation is applied to the beat wave according to the relationship: $1/|f_1-f_2|$;

counting the number of peaks of the thus-phase modulated beat wave for the period $1/|f_1-f_2|$ of the phase modulation; and thereafter, computing the distance to the target on the basis of the result of counting the number of peaks.

2. A method for measuring a distance to a target by transmitting a frequency-modulated electromagnetic wave to the target, receiving a reflected wave from the target, mixing the thus-received wave and the thus-transmitted wave into a beat wave and then detecting the beat wave, which comprises:

moving a lance into the target area after calibrating said lance outside the target area;

mixing the beat wave with a sine wave having a frequency $f_1$ and extracting an upper sideband wave of a plurality of sideband waves of the resultant mixed wave, and then mixing the thus extracted upper sideband wave with a sine wave having a frequency $f_2$ and extracting a lower sideband wave of said plurality of sideband waves of said resulting mixing wave, so that phase modulation is applied to the beat wave according to the relationship: $1/|f_1-f_2|$;

counting the number of peaks of the thus-phase modulated beat wave for the period $1/|f_1-f_2|$ of the phase modulation; and thereafter, computing the distance to the target on the basis of the result of counting the number of peaks.

3. A method for measuring a distance to a target by transmitting a frequency-modulated electromagnetic wave to the target, receiving a reflected wave from the target, mixing the thus-received wave and the thus-transmitted wave into a beat wave and then detecting the beat wave, which comprises:

mixing the beat wave with a sine wave having a frequency $f_1$ and extracting a lower sideband wave of a plurality of sideband waves of the resultant mixed wave, and then mixing the thus extracted lower sideband wave with a sine wave having a frequency $f_2$ and extracting an upper sideband wave of said plurality of sideband waves of said resulting mixed wave, so that phase modulation is applied to the beat wave according to the relationship: $1/|f_1-f_2|$;

counting the number of peaks of the thus-phase modulated beat wave for the period $1/|f_1-f_2|$ of the phase modulation; and thereafter, computing the distance to the target on the basis of the result of counting the number of peaks.

4. A method for measuring a distance to a target by transmitting a frequency-modulated electromagnetic wave to the target, receiving a reflected wave from the target mixing the thus-received wave and the thus-transmitted wave into a beat wave and then detecting the beat wave, which comprises:

moving a lance into the target area after calibrating said lance outside the target area;

mixing the beat wave with a sine wave having a frequency $f_1$ and extracting a lower sideband wave of a plurality of sideband waves of the resultant mixed wave, and then mixing the thus extracted lower sideband wave with a sine wave having a frequency $f_2$ and extracting an upper sideband wave of said plurality of sideband waves of said resulting mixed wave, so that phase modulation is applied to the beat wave according to the relationship: $1/|f_1-f_2|$;

counting the number of peaks of the thus-phase modulated beat wave for the period $1/|f_1-f_2|$ of the phase modulation; and thereafter, computing the distance to the target on the basis of the result of counting the number of peaks.

* * * * *